United States Patent
An et al.

(10) Patent No.: US 10,693,634 B2
(45) Date of Patent: Jun. 23, 2020

(54) KEY GENERATION METHOD AND APPARATUS USING DOUBLE ENCRYPTION

(71) Applicants: Alibaba Group Holding Limited, Grand Cayman (KY); Qing An, Hangzhou (CN); Yingfang Fu, Hangzhou (CN)

(72) Inventors: Qing An, Hangzhou (CN); Yingfang Fu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 130 days.

(21) Appl. No.: 15/752,743

(22) PCT Filed: Aug. 16, 2016

(86) PCT No.: PCT/CN2016/095522
§ 371 (c)(1),
(2) Date: Feb. 14, 2018

(87) PCT Pub. No.: WO2017/032242
PCT Pub. Date: Mar. 2, 2017

(65) Prior Publication Data
US 2018/0241549 A1    Aug. 23, 2018

(30) Foreign Application Priority Data
Aug. 26, 2015   (CN) .......................... 2015 1 0531892

(51) Int. Cl.
*H04L 9/08*    (2006.01)
*H04L 12/66*   (2006.01)
*H04L 29/06*   (2006.01)

(52) U.S. Cl.
CPC ............ *H04L 9/085* (2013.01); *H04L 9/0822* (2013.01); *H04L 9/0861* (2013.01);
(Continued)

(58) Field of Classification Search
None
See application file for complete search history.

(56) References Cited

U.S. PATENT DOCUMENTS

| 5,206,905 A | 4/1993 | Lee et al. |
| 5,226,137 A | 7/1993 | Bolan et al. |

(Continued)

FOREIGN PATENT DOCUMENTS

| CN | 103209075 A | 7/2013 |
| CN | 104753682 A | 7/2015 |
| WO | 2013089725 A1 | 6/2013 |

OTHER PUBLICATIONS

International Search Report and Written Opinion to corresponding International Application No. PCT/CN2016/095522 dated Nov. 6, 2016 (7 pages).

*Primary Examiner* — Brandon S Hoffman
(74) *Attorney, Agent, or Firm* — James J. DeCarlo; Greenberg Traurig, LLP

(57) ABSTRACT

The disclosure provides a key generation method and apparatus. The key generation method comprises: encrypting a first key factor generated by a first device with an initial key, and sending the encrypted first key factor to a second device through a first secure channel, wherein the initial key is a key preset for the first device and the second device; receiving, through the first secure channel, a second key factor encrypted with the initial key, wherein the second key factor is generated by the second device; decrypting the second key factor encrypted with the initial key and received through the first secure channel, so as to obtain the second key factor; and generating a shared key between the first device and the second device according to the first key factor and the second key factor. According to the disclosed embodiments, a gateway device is unable to acquire a shared key negotiated between a first device and a second device, ensuring the (Continued)

security of data transmitted there between, and further reducing the risk of data being illegally captured during transmission.

18 Claims, 15 Drawing Sheets

(52) U.S. Cl.
CPC ............ *H04L 9/0866* (2013.01); *H04L 12/66* (2013.01); *H04L 63/0478* (2013.01); *H04L 63/06* (2013.01); *H04L 2463/062* (2013.01)

(56) References Cited

U.S. PATENT DOCUMENTS

| | | | |
|---|---|---|---|
| 6,199,162 B1 | 3/2001 | Luyster | |
| 6,970,562 B2 | 11/2005 | Sandhu et al. | |
| 7,013,389 B1 | 3/2006 | Srivastava et al. | |
| 7,103,185 B1 | 9/2006 | Srivastava et al. | |
| 7,676,813 B2 | 3/2010 | Bisset et al. | |
| 8,050,405 B2 * | 11/2011 | Camp, Jr. | H04L 63/0442 380/260 |
| 9,887,838 B2 | 2/2018 | Khosravi et al. | |
| 2002/0078344 A1 | 6/2002 | Sandu et al. | |
| 2002/0078345 A1 | 6/2002 | Sandhu et al. | |
| 2002/0157016 A1 | 10/2002 | Russell et al. | |
| 2005/0125684 A1 * | 6/2005 | Schmidt | H04L 9/30 726/27 |
| 2008/0092239 A1 | 4/2008 | Sitrick et al. | |
| 2008/0092240 A1 | 4/2008 | Sitrick et al. | |
| 2008/0148067 A1 | 6/2008 | Sitrick et al. | |
| 2012/0257756 A1 * | 10/2012 | Huang | H04L 9/0836 380/281 |
| 2013/0227286 A1 * | 8/2013 | Brisson | H04L 63/062 713/168 |
| 2015/0039890 A1 | 2/2015 | Khosravi et al. | |

\* cited by examiner

KEY GENERATION METHOD AND APPARATUS USING DOUBLE ENCRYPTION

CROSS-REFERENCE TO RELATED APPLICATIONS

The present disclosure claims priority to Chinese Patent Application No. 201510531892.2, filed on Aug. 26, 2015 entitled "METHOD AND APPARATUS FOR KEY GENERATION" and PCT Appl. No. PCT/CN16/95522 filed on Aug. 16, 2016 and entitled "KEY GENERATION METHOD AND APPARATUS," both incorporated herein by reference in their entirety.

BACKGROUND

Technical Field

The disclosed embodiments relate to the field of network security technologies, and in particular, to key generation methods and apparatuses.

Description of the Related Art

In order to ensure secure transmission of data between a terminal device and a gateway device and between the gateway device and a public network server, respective secure transmission channels are usually established between the terminal device and the gateway device and between the gateway device and the public network server. The gateway device forwards data from one secure channel to another secure channel to implement data forwarding. However, during data forwarding, the gateway device needs to decrypt (with a key shared with the terminal device) data encrypted by the terminal device, and then encrypt the data with a key shared with the server before forwarding the data to the server. Therefore, the gateway device risks leaking data information.

SUMMARY

In view of this deficiency, the disclosure provides a novel technical solution, in which a gateway device will not be able to acquire a shared key between two devices, thereby reducing the risk of data being illegally captured during network transmission.

In order to achieve the aforementioned objective, the disclosure provides the following technical solutions.

According to a first aspect of the disclosure, a key generation method is provided, which is applied to a first device, the method comprising: encrypting a first key factor generated by the first device with an initial key, and sending the encrypted first key factor to a second device through a first secure channel, wherein the initial key is a key preset for the first device and the second device; receiving, through the first secure channel, a second key factor encrypted with the initial key, wherein the second key factor is generated by the second device; decrypting the second key factor encrypted with the initial key and received through the first secure channel, so as to obtain the second key factor; and generating a shared key between the first device and the second device according to the first key factor and the second key factor.

According to a second aspect of the disclosure, a key generation method is provided, which is applied to a second device, the method comprising: receiving, from a first device through a second secure channel, a first key factor encrypted with an initial key, wherein the initial key is a key preset between the first device and the second device; decrypting the first key factor encrypted with the initial key, so as to obtain the first key factor; and generating a shared key between the first device and the second device according to the first key factor and a second key factor generated by the second device.

According to a third aspect of the disclosure, a key generation apparatus is provided, which is applied to a first device, the method comprising: a first encryption module, configured to encrypt a first key factor generated by the first device with an initial key, and sending the encrypted first key factor to a second device through a first secure channel, wherein the initial key is a key preset for the first device and the second device; a first receiving module, configured to receive, through the first secure channel, a second key factor encrypted with the initial key, wherein the second key factor is generated by the second device; a first decryption module, configured to decrypt the second key factor encrypted with the initial key and received by the first receiving module through the first secure channel, so as to obtain the second key factor. A first key generation module, configured to generate a shared key between the first device and the second device according to the first key factor and the second key factor decrypted by the first decryption module.

According to a fourth aspect of the disclosure, a key generation apparatus is provided, which is applied to a second device, the method comprising: a third receiving module, configured to receive, from a first device through a second secure channel, a first key factor encrypted with an initial key, wherein the initial key is a key preset between the first device and the second device; a third decryption module, configured to decrypt the first key factor encrypted with the initial key, so as to obtain the first key factor. A second key generation module, configured to generate a shared key between the first device and the second device according to the first key factor and a second key factor generated by the second device.

As can be seen from the aforementioned technical solutions, a first key factor and a second key factor are both encrypted with an initial key when being forwarded by a gateway device. The initial key is a key preset for a first device and a second device. The gateway device, therefore, will not be able to know the first key factor and the second key factor; a shared key between the first device and the second device is generated through the first key factor and the second key factor. The finally negotiated shared key is therefore only known to the first device and the second device. The gateway device still is not able to acquire the negotiated shared key, thus ensuring a secure data transmission between the first device and the second device, and further reducing the risk of the data being illegally captured during transmission.

DETAILED DESCRIPTION

Figure 1:
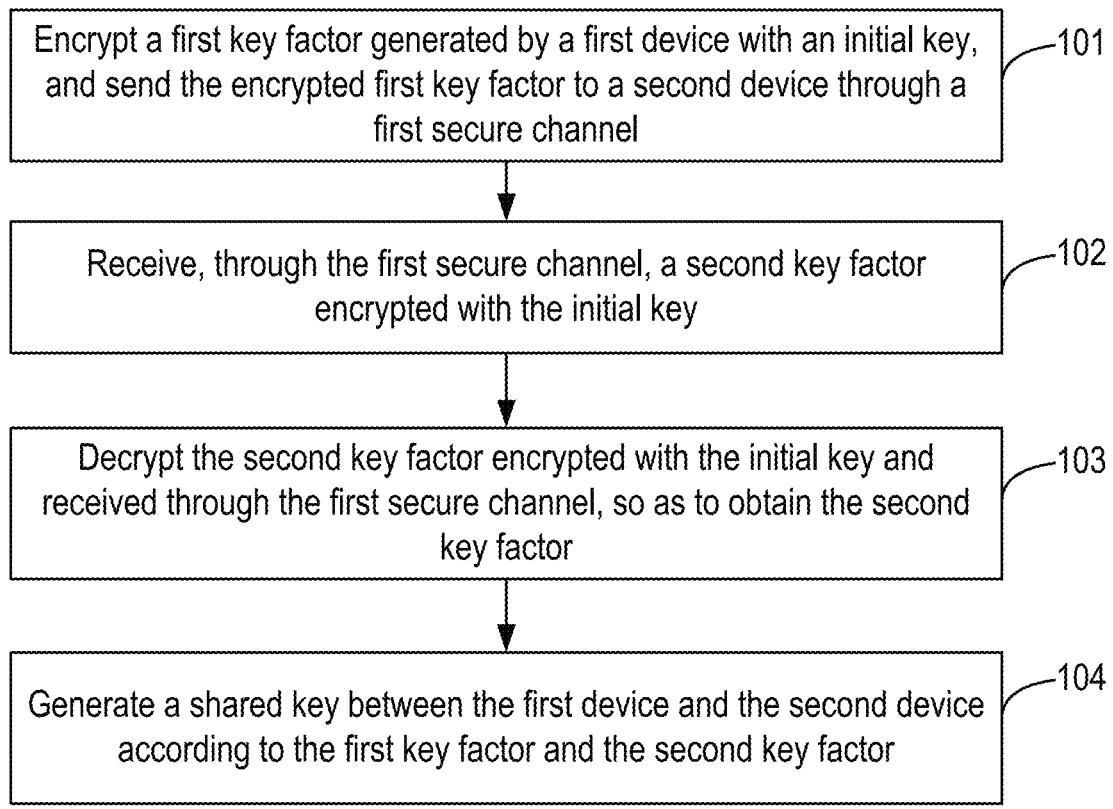
FIG. 1 is a flow diagram illustrating a key generation method according to according to some embodiments of the disclosure.

Exemplary embodiments will be described in detail here, and examples thereof are shown in the drawings. The following description refers to the drawings in which the same numbers in different drawings represent the same or similar elements unless otherwise indicated. Implementations described in the following exemplary embodiments are not representative of all implementations consistent with the disclosure. Instead, they are merely examples of apparatuses and methods consistent with some aspects of the disclosure as recited in the appended claims.

The terms used in the disclosure are for the purpose of describing particular embodiments only and are not intended to limit the disclosure. The singular forms "a", "an", and "the" used in the disclosure are also intended to include plural forms, unless the context clearly indicates otherwise. It should also be understood that the term "and/or" as used herein refers to and encompasses any or all possible combinations of one or more of the associated listed items.

It should be understood that although various types of information may be described using terms such as first, second, and third in the disclosure, such information should not be limited by these terms. These terms are only used to distinguish one type of information from another type of information. For example, first information may also be referred to as second information; and similarly, second information may also be referred to as first information without departing from the scope of the disclosure. Depending on the context, the word "if" as used herein may be construed to mean "when . . . " or "upon . . . " or "in response to determining".

The following embodiments are provided to further describe the disclosure.

According to an embodiment of the disclosure, a first key factor and a second key factor are both encrypted with an initial key when being forwarded by a gateway device. The initial key is a key preset for a first device and a second device. The gateway device, therefore, will not be able to know the first key factor and the second key factor. A shared key between the first device and the second device is generated through the first key factor and the second key factor. The finally negotiated shared key is therefore only known to the first device and the second device. The gateway device still is not able to acquire the negotiated shared key, thus ensuring a secure data transmission between the first device and the second device, and further reducing the risk of the data being illegally captured during transmission.

FIG. 1 is a flow diagram illustrating a key generation method according to according to some embodiments of the disclosure. In the illustrated embodiment, a first device may be a terminal device, and a second device may be a server. Alternatively, the first device may be a server, and the second device may be a terminal device. The illustrated embodiment is exemplarily described by being applied to a terminal device as an example. As shown in FIG. 1, the key generation method includes the following steps.

Step 101: Encrypt a first key factor generated by the first device with an initial key, and sending the encrypted first key factor to a second device through a first secure channel, wherein the initial key is a key preset for the first device and the second device.

Step 102: Receive, through the first secure channel, a second key factor encrypted with the initial key, wherein the second key factor is generated by the second device.

Step 103: Decrypt the second key factor encrypted with the initial key and received through the first secure channel, so as to obtain the second key factor.

Step 104: Generate a shared key between the first device and the second device according to the first key factor and the second key factor.

Regarding step 101, in one embodiment, an initial key $K_{basic}$ may be issued by the second device to the first device before the first device is put into use. The initial key $K_{basic}$ may be issued to the first device by writing the initial key in the hardware of the device. In one embodiment, relevant information is forwarded by a gateway device between the first device and the second device, wherein the first secure channel may be established through negotiation between the first device and the gateway device. The relevant information is transmitted through the first secure channel. A second secure channel may be established through negotiation between a server and the gateway device. The relevant information is transmitted through the second secure channel. Those skilled in the art should understand that the process of establishing the first secure channel and the second secure channel may be performed using an existing security protocol. For example, a key negotiation mechanism of Secure Socket Layer (SSL for short) or Transport Layer Security (TLS for short) may be used for this purpose.

In one embodiment, when the first device needs to initiate a key negotiation procedure with the second device, the first key factor is generated through a pseudo-random function. The first key factor is encrypted using the initial key to obtain the first key factor after being subjected to a first encryption. The first key factor after being subjected to the first encryption is encrypted using a first encryption key of the first secure channel to obtain the first key factor after being subjected to a second encryption. The first key factor is double-encrypted so that the first key factor is unknown to the gateway device, avoiding the risk of the first key factor being illegally captured at the gateway device.

In step 103, the double-encrypted second key factor is decrypted with the first encryption key to obtain the second key factor after being subjected to the first decryption. The second key factor after being subjected to the first decryption is decrypted with the initial key to obtain the second key factor. Since the second key factor is already double-encrypted at the second device, the second key factor is unknown to the gateway device, avoiding the risk of the second key factor being illegally captured at the gateway device side.

Regarding how to generate a shared key between the first device and the second device according to the first key factor and the second key factor in step 104, reference may be made to the description of the embodiments described herein. Step 104 is not described in detail herein, but the description herein is incorporated by reference in its entirety.

As can be seen from the above description, a first key factor and a second key factor are both encrypted with an initial key when being forwarded by a gateway device. The initial key is a key preset for a first device and a second device. The gateway device, therefore, will not be able to know the first key factor and the second key factor. A shared key between the first device and the second device is generated through the first key factor and the second key factor. The finally negotiated shared key is therefore only known to the first device and the second device. The gateway device still is not able to acquire the negotiated shared key, thus ensuring a secure data transmission between the first device and the second device, and further reducing the risk of the data being illegally captured during transmission.

Figure 2:
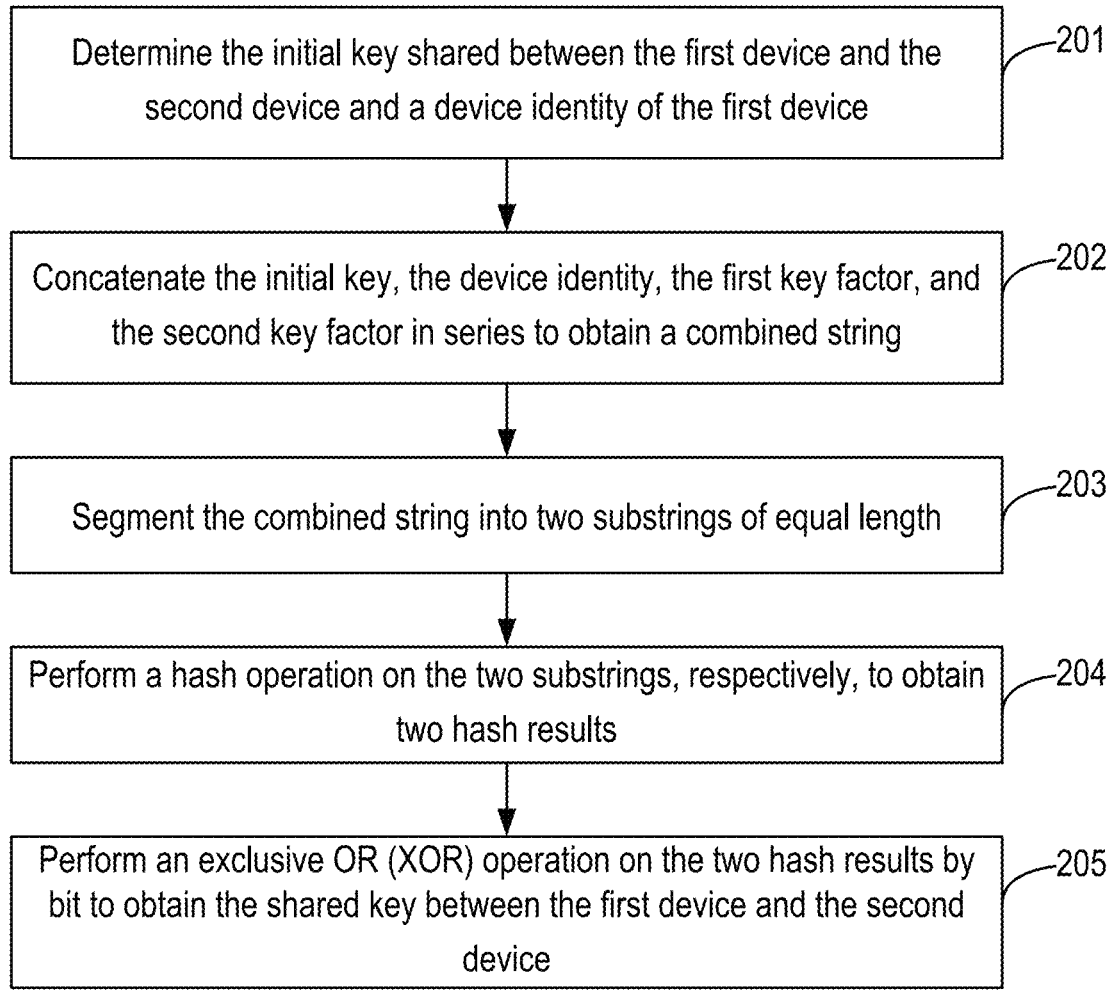
FIG. 2 is a flow diagram illustrating a key generation method according to according to some embodiments of the disclosure.

FIG. 2 is a flow diagram illustrating a key generation method according to according to some embodiments of the disclosure. This embodiment is exemplarily described by using how to generate a shared key between the first device and the second device through the first key factor and the second key factor in step 104 in the embodiments shown in FIG. 1 as an example. As shown in FIG. 2, the key generation method includes the following steps.

Step 201: Determine the initial key shared between the first device and the second device and a device identity of the first device.

Step 202: Concatenate the initial key, the device identity, the first key factor, and the second key factor in series to obtain a combined string.

Step 203: Segment the combined string into two substrings of equal length.

Step 204: Perform a hash operation on the two substrings, respectively, to obtain two hash results.

Step 205: Perform an exclusive OR (XOR) operation on the two hash results by bit to obtain the shared key between the first device and the second device.

After the first device obtains the second key factor through step 103 in the embodiments shown in FIG. 1, the first device has the first key factor p and the second key factor q. The first device may use the first key factor p and the second key factor q as inputs and use a shared key generation algorithm (KeyGenerate) to obtain a key $K_{AC}$. The key generation algorithm is as follows:

$$K_{AC} = \text{KeyGenerate } (K_{basic}, \text{SharedKey}, p, q),$$

where $K_{basic}$ is the initial key and SharedKey is the device identity of the first device. The device identity may be a device serial number of the first device, or a MAC address, or a combination of the two, or the like. If the second device can distinguish the first device from other devices through the device identity, that will suffice.

Additionally, in the process of generating the shared key through the function KeyGenerate, a string corresponding to the initial key $K_{basic}$, SharedKey, p, and q may be concatenated in series to obtain a combined string. The shared key $K_{AC}$ is generated from the combined string using the function KeyGenerate.

In one embodiment, the process implemented by the function KeyGenerate may comprise: segmenting an inputted combined string into two substrings of equal length (if the length of the combined string is an odd number, 1 is added to the last bit of the combined string); afterwards, separately perform a hash operation (for example, MD5) on the two substrings; perform an XOR operation on the two obtained computation results by bit. The obtained result is the shared key $K_{AC}$.

Exemplary description is made by using MD5 as an example. Since MD5 can convert an input of any length into a result of a 128-bit length, the length of the shared key $K_{AC}$ is 128 bits, thereby reducing the complexity of shared key computation. Since the computation of the shared key $K_{AC}$ uses MD5, the computational burden is bearable for the first device with limited computing power.

In this embodiment, a shared key $K_{AC}$ is generated through the first key factor, the second key factor, the initial key, and a device identity of the first device, so that the shared key $K_{AC}$ is securely negotiated and shared between the first device and the second device. The shared key $K_{AC}$ is unknown to the gateway device serving as an intermediate node, thus ensuring that the first device can use the shared key $K_{AC}$ to encrypt data to be sent to the second device, and ensuring security of the data during network transmission.

Figure 3:
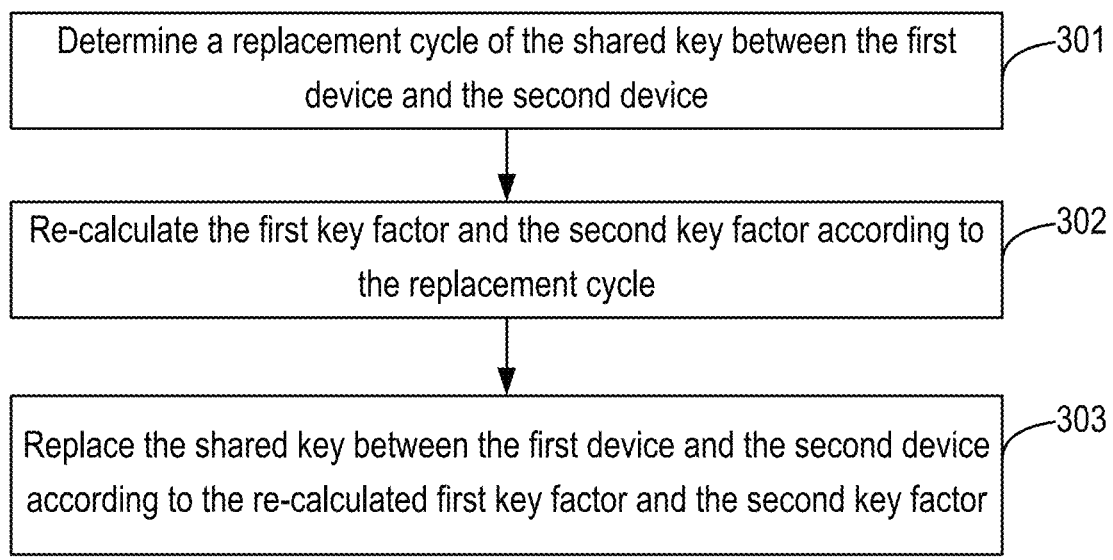
FIG. 3 is a flow diagram illustrating a key generation method according to according to some embodiments of the disclosure.

FIG. 3 is a flow diagram illustrating a key generation method according to according to some embodiments of the disclosure. On the basis of the aforementioned embodiment, as shown in FIG. 3, the key generation method includes the following steps.

Step 301: Determine a replacement cycle of the shared key between the first device and the second device.

Step 302: Re-calculate the first key factor and the second key factor according to the replacement cycle.

Step 303: Replace the shared key between the first device and the second device according to the re-calculated first key factor and the second key factor.

In one embodiment, the first device and the second device may specify the replacement cycle of the shared key $K_{AC}$. After the shared key $K_{AC}$ is used for a time corresponding to the replacement cycle, a procedure of generating the shared key $K_{AC}$ is initiated between the first device and the second device again, so as to further ensure the security of the shared key $K_{AC}$ and the security of data during network transmission, and further reducing the possibility of the shared key $K_{AC}$ being cracked.

Figure 4:
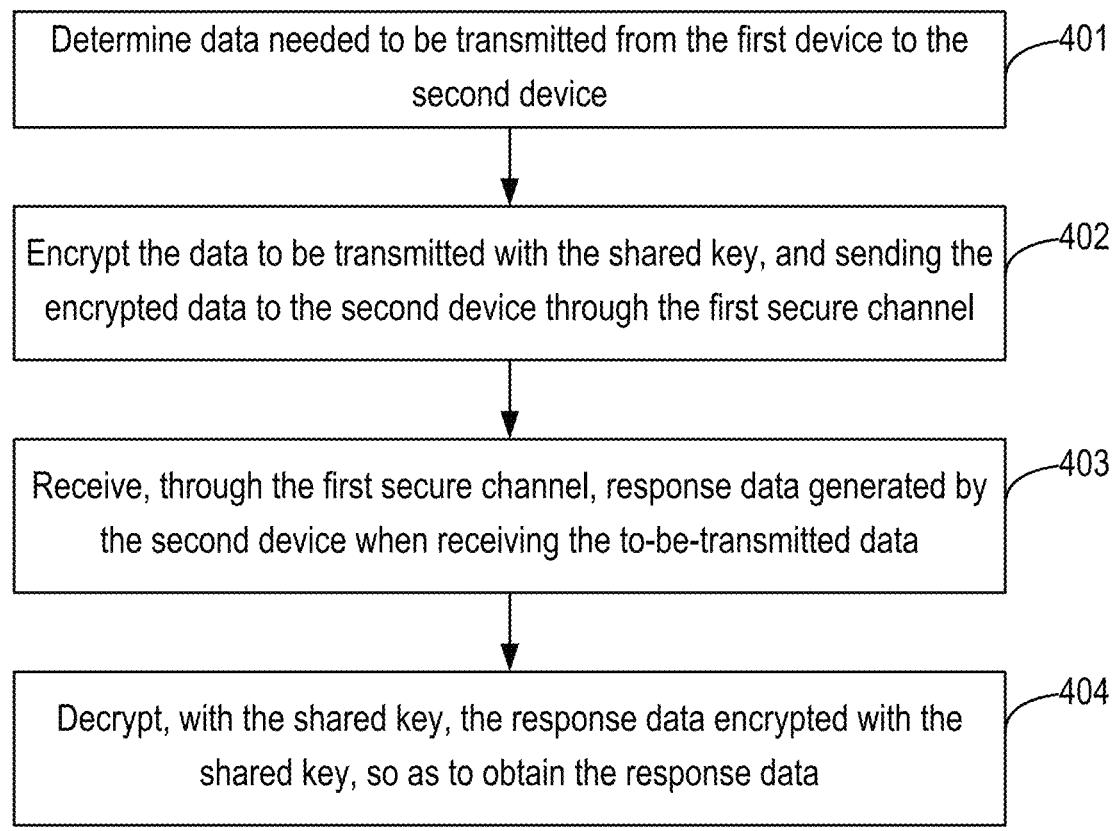
FIG. 4 is a flow diagram illustrating a key generation method according to according to some embodiments of the disclosure.

FIG. 4 is a flow diagram illustrating a key generation method according to according to some embodiments of the disclosure. After the shared key is generated in the embodiments shown in FIG. 1, data to be transmitted by the first device may be encrypted with the shared key and transmitted to the second device. As shown in FIG. 4, the process of encrypting and transmitting the to-be-transmitted data includes the following steps.

Step 401: Determine data needed to be transmitted from the first device to the second device.

Step 402: Encrypt the data to be transmitted with the shared key, and sending the encrypted data to the second device through the first secure channel.

Step 403: Receive, through the first secure channel, response data generated by the second device when receiving the to-be-transmitted data, wherein the response data has already been encrypted with the shared key.

Step 404: Decrypt, with the shared key, the response data encrypted with the shared key, so as to obtain the response data.

In step 401, the to-be-transmitted data may be Internet of Things data acquired by a sensor on the first device.

Regarding the relevant description of the first secure channel in step 402 and step 403, reference may be made to the relevant description of the embodiments shown in FIG. 1, which will not be described in detail herein again but is incorporated by reference.

In step 404, when the response data encrypted with the shared key is received through the first secure channel, the response data encrypted with the shared key may be decrypted first with the first encryption key of the first secure channel. Then the response data is decrypted for the second time with the shared key, so as to obtain the original response data.

In this embodiment, since data to be transmitted is encrypted with the shared key when being forwarded by the gateway device, and the shared key is a key jointly negotiated between the first device and the second device, the gateway device will not know the shared key, thus ensuring that the to-be-transmitted data is transmitted more securely between the first device and the second device, and further reducing the risk of the data being illegally captured during transmission.

Figure 5:
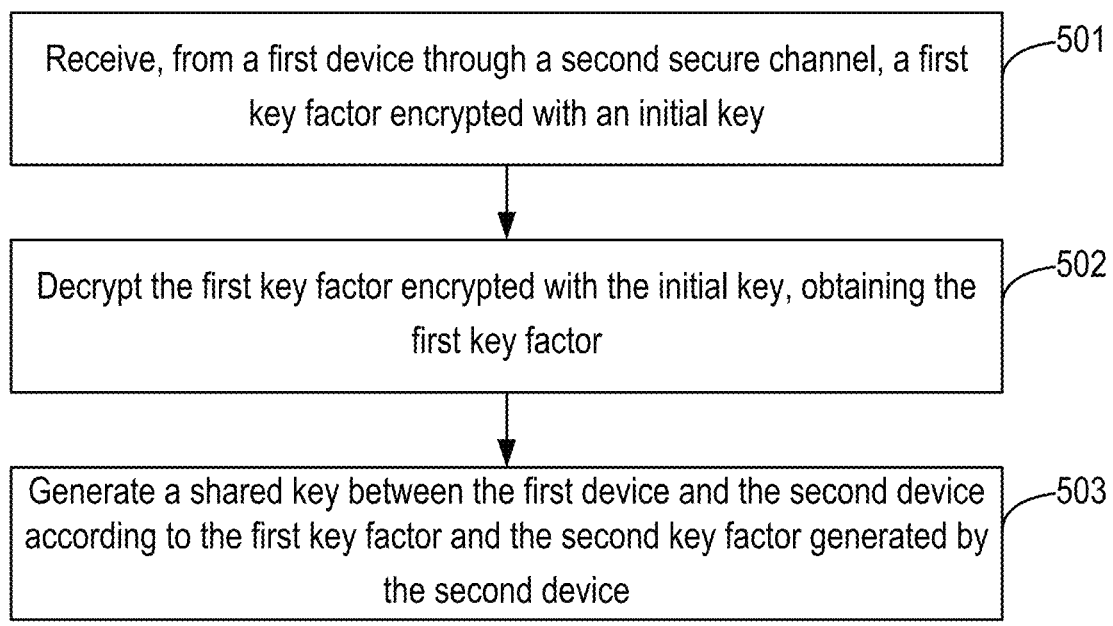
FIG. 5 is a flow diagram illustrating a key generation method according to according to some embodiments of the disclosure.

FIG. 5 is a flow diagram illustrating a key generation method according to according to some embodiments of the disclosure. In this embodiment, a first device may be a terminal device, and a second device may be a server. This embodiment may be applied to the second device. As shown in FIG. 5, the key generation method includes the following steps.

Step 501: Receive, from a first device through a second secure channel, a first key factor encrypted with an initial key, wherein the initial key is a key preset between the first device and the second device.

Step 502: Decrypt the first key factor encrypted with the initial key, obtaining the first key factor.

Step 503: Generate a shared key between the first device and the second device according to the first key factor and the second key factor generated by the second device.

Regarding the relevant description of the second secure channel in step 501, reference may be made to the relevant description of the embodiments shown in FIG. 1, which will not be described in detail herein again but is incorporated by reference.

In step 502, after the first key factor encrypted with the initial key is received through the second secure channel, the first key factor encrypted with the initial key may be decrypted first with a second encryption key of the second secure channel. Then the first key factor is decrypted for the second time with the initial key, so as to obtain the original first key factor.

Regarding how to generate a shared key between the first device and the second device according to the first key factor and the second key factor in step 503, reference may be made to the description of the embodiments shown in FIG. 2, which will not be described in detail herein again but is incorporated by reference.

As can be seen from the above description, a first key factor and a second key factor are both encrypted with an initial key when being forwarded by a gateway device. The initial key is a key preset for a first device and a second device. The gateway device, therefore, will not be able to know the first key factor and the second key factor; a shared key between the first device and the second device is generated through the first key factor and the second key factor. The finally negotiated shared key is therefore only known to the first device and the second device. The gateway device still is not able to acquire the negotiated shared key, thus ensuring a secure data transmission between the first device and the second device, and further reducing the risk of the data being illegally captured during transmission.

Figure 6:
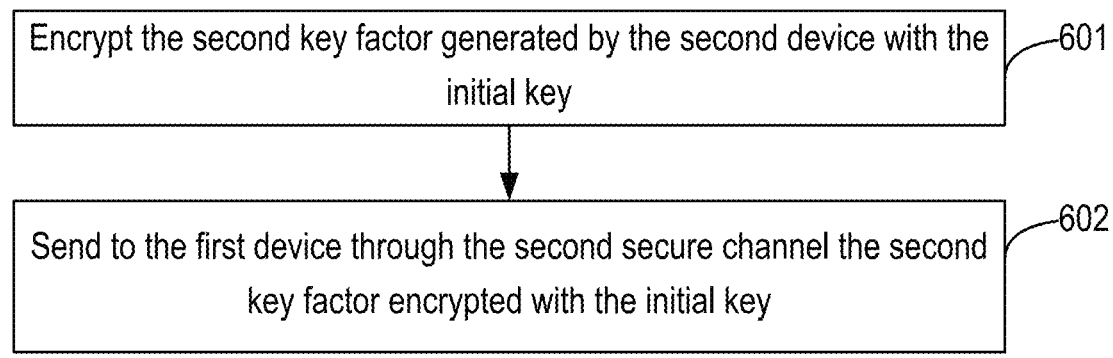
FIG. 6 is a flow diagram illustrating a key generation method according to according to some embodiments of the disclosure.

FIG. 6 is a flow diagram illustrating a key generation method according to according to some embodiments of the disclosure. As shown in FIG. 6, the key generation method includes the following steps.

Step 601: Encrypt the second key factor generated by the second device with the initial key.

Step 602: Send to the first device through the second secure channel the second key factor encrypted with the initial key.

In this embodiment, the second key factor encrypted with the initial key is encrypted for a second time with a second encryption key of the second secure channel. The second key factor is therefore unknown to the gateway device when being forwarded by the gateway device during the process of sending the second key factor to the first device, avoiding the risk of the second key factor being illegally captured at the gateway device.

Figure 7:
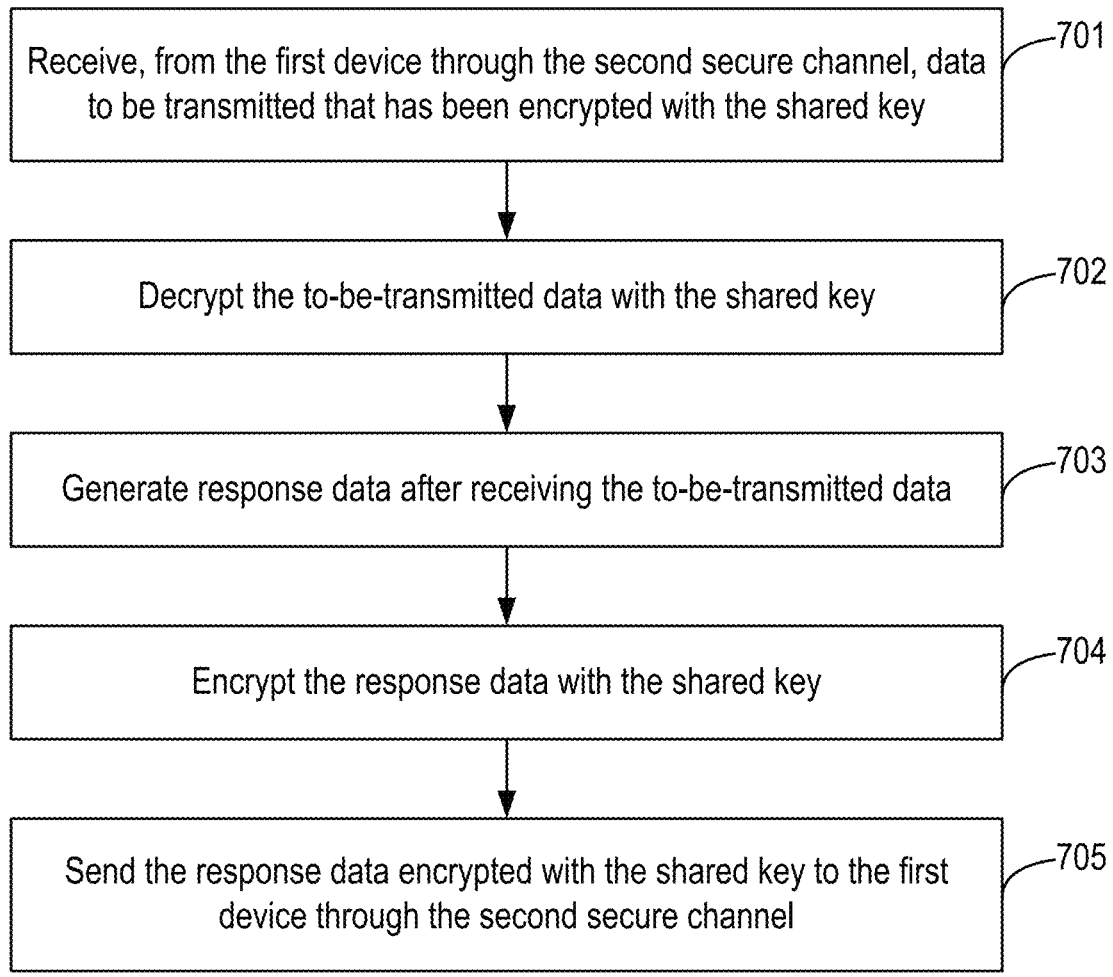
FIG. 7 is a flow diagram illustrating a key generation method according to according to some embodiments of the disclosure.

FIG. 7 is a flow diagram illustrating a key generation method according to according to some embodiments of the disclosure. As shown in FIG. 7, the key generation method includes the following steps.

Step 701: Receive, from the first device through the second secure channel, data to be transmitted that has been encrypted with the shared key.

Step 702: Decrypt the to-be-transmitted data with the shared key.

Step 703: Generate response data after receiving the to-be-transmitted data.

Step 704: Encrypt the response data with the shared key.

Step 705: Send the response data encrypted with the shared key to the first device through the second secure channel.

Regarding the relevant description of the second secure channel in step 701, reference may be made to the relevant description of the embodiments shown in FIG. 1, which will not be described in detail herein again but is incorporated by reference.

In step 704, after the to-be-transmitted data is received from the first device through the second secure channel, the to-be-transmitted data is decrypted with the shared key to obtain original data. When a response needs to be made to the first device, the response data encrypted with the shared key may be encrypted first with a second encryption key of the second secure channel, so that the gateway device will not be able to acquire the original response data in the process of forwarding the response data.

In this embodiment, since data to be transmitted is encrypted with the shared key when being forwarded by the gateway device, and the shared key is a key jointly negotiated between the first device and the second device, the gateway device will not know the shared key, thus ensuring that the to-be-transmitted data is transmitted more securely between the first device and the second device, and further reducing the risk of the data being illegally captured during transmission.

Through the aforementioned embodiment, a shared key may be generated through a key generation algorithm locally at a first device and a second device based on an initial key preset for the first device and the second device; and finally, data to be transmitted is encrypted using the shared key, so that a gateway device is unable to view the original data when forwarding the data in the network, thereby achieving the purpose of secure data transmission.

Figure 8:
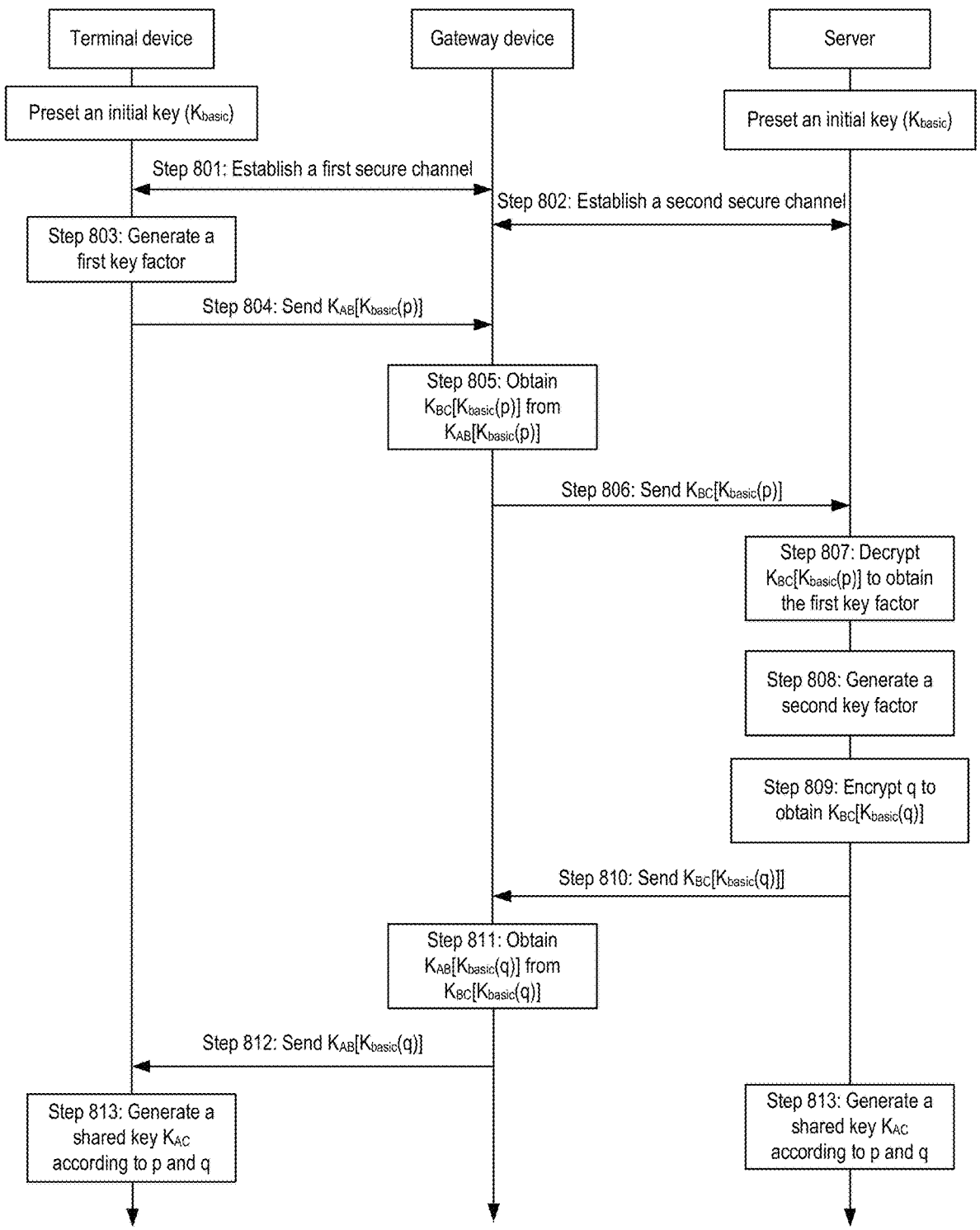
FIG. 8 is a swim lane diagram illustrating key negotiation between a terminal device and a server according to some embodiments of the disclosure.

FIG. 8 is a swim lane diagram illustrating key negotiation between a terminal device and a server according to some embodiments of the disclosure. Exemplary description is made by using a first device being a terminal device and a second device being a server as an example. Before the terminal device accesses a network, the server needs to issue an initial key ($K_{basic}$) to the terminal device in advance, wherein the initial key ($K_{basic}$) may be issued to the terminal device through hardware writing or the like. As shown in FIG. 8, the key negotiation between the terminal device and the server includes the following steps.

Step 801: The terminal device negotiates a first encryption key ($K_{AB}$) of a first secure channel with a gateway device, and establishes the first secure channel between the terminal device and the gateway device. Regarding methods of establishing the first secure channel, reference may be made to the relevant description of existing techniques (e.g., SSL) described above.

Step 802: The gateway device negotiates a second encryption key ($K_{BC}$) of a second secure channel with the server, and establishes the second secure channel. Similar to the aforementioned step 801, reference may be made to the relevant description of existing techniques described above for the process of establishing the second secure channel, which may also use a key negotiation mechanism of SSL or TLS. Those skilled in the art should understand that step 801 and step 802 are interchangeable in sequence. The execution sequence may be set according to actual execution needs.

Step 803: The terminal device prepares to initiate a key negotiation procedure with the server. The terminal device generates a first key factor (p), wherein the first key factor is used for generating a shared key between the terminal device and the server. Meanwhile, the first key factor is encrypted with the initial key ($K_{basic}$) to obtain $K_{basic}(p)$, and then $K_{basic}(p)$ is encrypted with the first encryption key $K_{AB}$ to obtain $K_{AB}[K_{basic}(p)]$.

Step 804: The terminal device sends the double-encrypted first key factor $K_{AB}[K_{basic}(p)]$ to the gateway device through the first secure channel.

Step 805: After receiving the double-encrypted first key factor $K_{AB}[K_{basic}(p)]$, the gateway device decrypts the double-encrypted first key factor $K_{AB}[K_{basic}(p)]$ with the first encryption key $K_{AB}$ of the first secure channel to obtain $K_{basic}(p)$; and afterwards encrypts $K_{basic}(p)$ with the second encryption key $K_{BC}$ of the second secure channel to obtain double-encrypted $K_{BC}[K_{basic}(p)]$.

Step 806: Send the first key factor $K_{BC}[K_{basic}(p)]$ double-encrypted with the initial key and the second encryption key to the server through the second secure channel.

Step 807: After receiving the double-encrypted first key factor, the server decrypts the double-encrypted first key factor with the second encryption key $K_{BC}$ of the second secure channel to obtain $K_{basic}(p)$; and afterwards decrypts $K_{basic}(p)$ with the initial key $K_{basic}$ to obtain the first key factor p.

Step 808: The server generates a second key factor (q) through a pseudo-random function, wherein the second key factor q will be used together with the first key factor p, as parameters for generating a shared key $K_{AC}$.

Step 809: The server encrypts the second key factor q with the initial key $K_{basic}$ to obtain $K_{basic}(q)$, and then encrypts $K_{basic}(q)$ with the second encryption key $K_{BC}$ to obtain $K_{BC}[K_{basic}(q)]$.

Step 810: The server sends the double-encrypted second key factor $K_{BC}[K_{basic}(q)]$ to the gateway device through the second secure channel.

Step 811: After receiving the double-encrypted second key factor $K_{BC}[K_{basic}(q)]$, the gateway device decrypts the double-encrypted second key factor with the second encryption key $K_{BC}$ of the second secure channel to obtain $K_{basic}(q)$; afterwards encrypts $K_{basic}(q)$ with the first encryption key $K_{AB}$ of the first secure channel to obtain $K_{AB}[K_{basic}(q)]$; and afterwards sends the double-encrypted second key factor to the terminal device through the first secure channel.

Step 812: After receiving the double-encrypted second key factor, the terminal device decrypts the double-encrypted second key factor with the first encryption key $K_{AB}$ of the first secure channel to obtain $K_{basic}(q)$; and afterwards decrypts $K_{basic}(q)$ after being subjected to the first decryption for the second time with the initial key $K_{basic}$ to obtain the second key factor q.

Step 813: The terminal device and the server both share the first key factor p and the second key factor q. The terminal device and the server both use the first key factor and the second key factor as inputs and use a key generation algorithm to obtain the shared key $K_{AC}$ between the terminal device and the server. Regarding the detailed description of the key generation algorithm, reference may be made to the relevant description of the embodiments shown in FIG. 2, which will not be described in detail herein again but is incorporated by reference.

In this embodiment, a shared key $K_{AC}$ is thus securely negotiated and shared between a terminal device and a public network server. The shared key is therefore unknown to a gateway device serving as an intermediate node; and afterwards, the terminal device can use the shared key to encrypt Internet of Things data to be sent to the public network server, thereby ensuring the security of data transmission.

In order to further ensure the security of the shared key and data transmission, the terminal device may periodically perform a key negotiation procedure with the server to replace the shared key $K_{AC}$, so as to further reduce the possibility of shared key being cracked.

Figure 9:
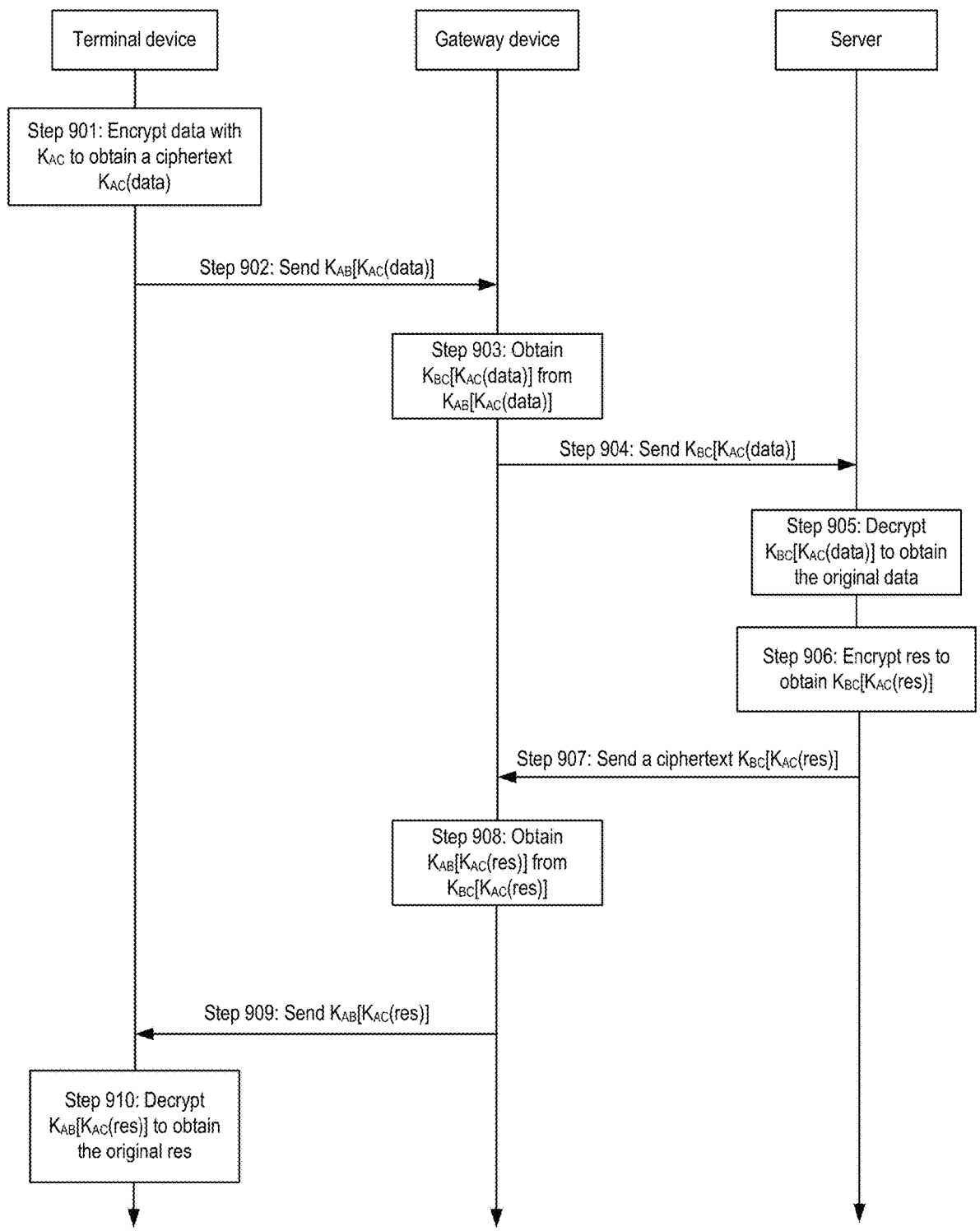
FIG. 9 is a swim lane diagram illustrating data transmission between a terminal device and a server according to some embodiments of the disclosure.

FIG. 9 is a swim lane diagram illustrating data transmission between a terminal device and a server according to some embodiments of the disclosure. After a shared key is generated through the embodiments shown in FIG. 8, if a terminal device needs to send Internet of Things data (data) to a server, the data transmission method includes the following steps as shown in FIG. 9.

Step 901: Perform first encryption on Internet of Things data with a shared key $K_{AC}$ to obtain a cipher text $K_{AC}(data)$; and afterwards, perform a second encryption with a first encryption key $K_{AB}$ of a first secure channel to obtain a cipher text $K_{AB}[K_{AC}(data)]$.

Step 902: The terminal device sends the cipher text $K_{AB}[K_{AC}(data)]$ to a gateway device through the first secure channel.

Step 903: After receiving the cipher text $K_{AB}[K_{AC}(data)]$, the gateway device decrypts the cipher text $K_{AB}[K_{AC}(data)]$ with the first encryption key $K_{AB}$ to obtain $K_{AC}(data)$; and then encrypts $K_{AC}(data)$ with a second encryption key $K_{BC}$ to obtain a cipher text $K_{BC}[K_{AC}(data)]$.

Step 904: The gateway device sends the cipher text $K_{BC}[K_{AC}(data)]$ to the server through a second secure channel.

Step 905: After receiving the double-encrypted cipher text $K_{BC}[K_{AC}(data)]$, the server decrypts the cipher text $K_{BC}[K_{AC}(data)]$ with the second encryption key $K_{BC}$ to obtain $K_{AC}(data)$; and then decrypts $K_{AC}(data)$ with the shared key $K_{AC}$ to obtain the original Internet of Things data data.

Step 906: After obtaining the original Internet of Things data, the server generates response data (res); encrypts the response data with the shared key $K_{AC}$ to obtain a cipher text $K_{AC}(res)$; and then performs the second encryption with the second encryption key $K_{BC}$ to obtain $K_{BC}[K_{AC}(res)]$.

Step 907: The server sends the double-encrypted cipher text $K_{BC}[K_{AC}(res)]$ to the gateway device through the second secure channel.

Step 908: After receiving the double-encrypted cipher text $K_{BC}[K_{AC}(res)]$, the gateway device decrypts the cipher text $K_{BC}[K_{AC}(res)]$ with the second encryption key $K_{BC}$ to obtain $K_{AC}(res)$; and then encrypts $K_{AC}(res)$ with the first encryption key $K_{AB}$ to obtain a cipher text $K_{AB}[K_{AC}(res)]$.

Step 909: The gateway device sends the double-encrypted cipher text $K_{AB}[K_{AC}(res)]$ to the terminal device through the first secure channel.

Step 910: After receiving the double-encrypted cipher text $K_{AB}[K_{AC}(res)]$, the terminal device decrypts the cipher text $K_{AB}[K_{AC}(res)]$ with the first encryption key $K_{AB}$ to obtain $K_{AC}(res)$; and then decrypts $K_{AC}(res)$ with the shared key $K_{AC}$ to obtain the original response data (res).

This embodiment enables cross-domain key negotiation and sharing between a terminal device and a server through a gateway device as an intermediate node. A shared key is unknown to the gateway device, thereby ensuring end-to-end secure transmission of Internet of Things data between the terminal device and the server. Additionally, secure data transmission between the terminal device and the gateway device, and secure data transmission between the gateway device and the public network server are ensured. Forwarding of the data in the gateway device on the transmission path is also protected for security. Even if the gateway device is illegally accessed, the Internet of Things data forwarded through the gateway device is still protected with the encryption of the shared key, thereby avoiding the Internet of Things data being illegally captured.

Figure 10:
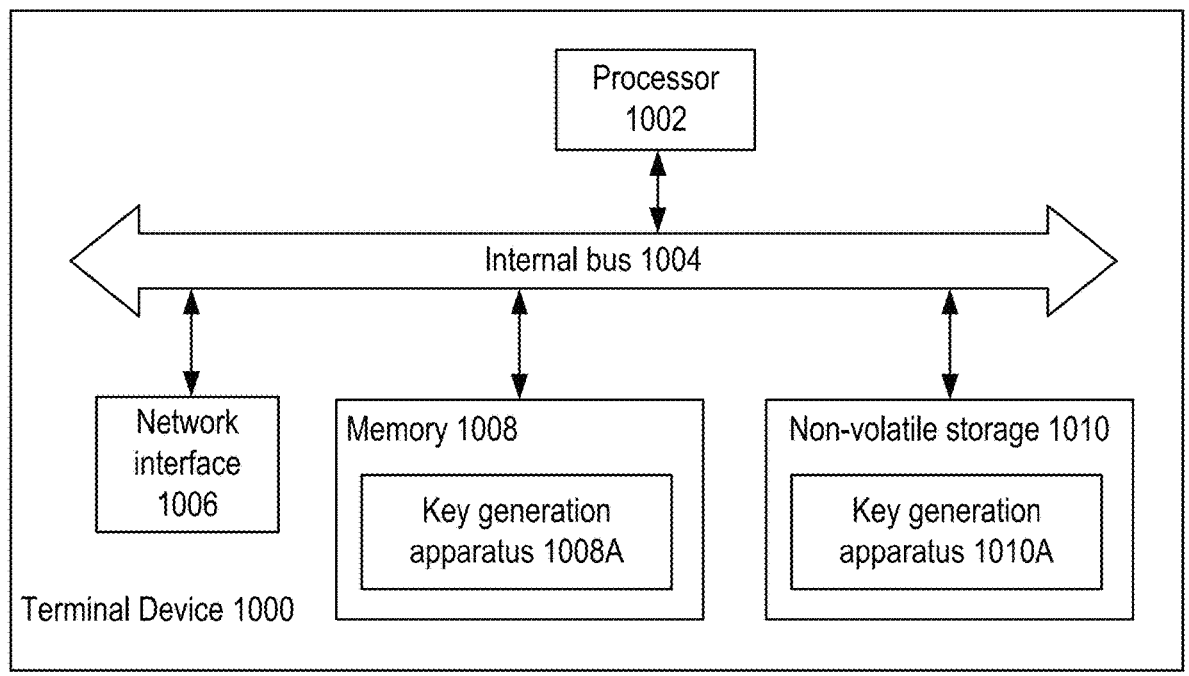
FIG. 10 is a block diagram illustrating a terminal device according to some embodiments of the disclosure.

In accordance with the aforementioned key generation method, the disclosure further provides a block diagram illustrating a terminal device according to an exemplary embodiment of the disclosure shown in FIG. 10.

FIG. 10 is a block diagram illustrating a terminal device 1000 according to some embodiments of the disclosure. On a hardware level, the device 1000 includes a processor 1002, an internal bus 1004, a network interface 1006, a memory 1008, and a non-volatile storage 1010; and certainly this may also include hardware required by other services. The processor 1002 reads a corresponding computer program 1010A into the memory 1008 from the non-volatile storage 1010 and then runs the computer program, so as to form a key generation apparatus 1008A on a logical level. Certainly, in addition to the software implementation, the disclosure does not exclude other implementations, like using a logical device or a combination of software and hardware. That is to say, execution bodies of the following processing flows are not limited to logical units, and may also be hardware or logical devices.

Figure 11:
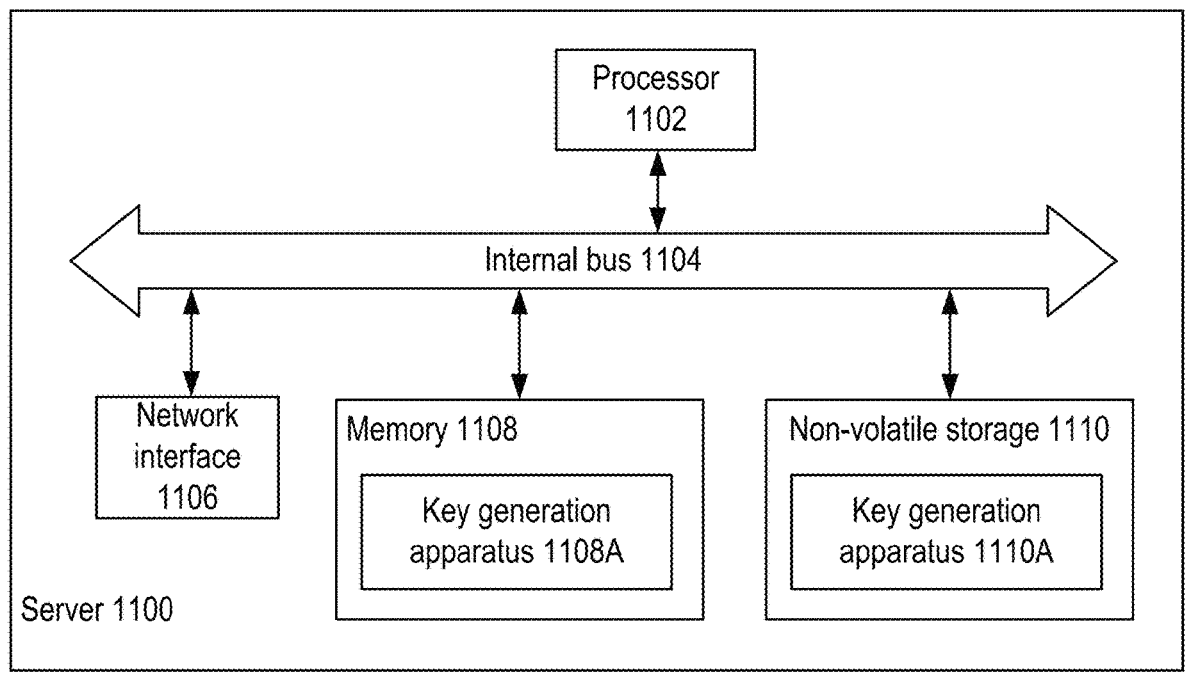
FIG. 11 is a block diagram illustrating a server according to some embodiments of the disclosure.

In accordance with the aforementioned key generation method, the disclosure further provides a block diagram illustrating a server according to an exemplary embodiment of the disclosure shown in FIG. 11.

FIG. 11 is a block diagram illustrating a server according to some embodiments of the disclosure. On a hardware level, the network server 1100 includes a processor 1102, an internal bus 1104, a network interface 1106, a memory 1108, and a non-volatile storage 1110; and certainly this may also include hardware required by other services. The processor 1102 reads a corresponding computer program 1110A into the memory 1108 from the non-volatile storage 1110 and then runs the computer program, so as to form a key generation apparatus 1108A on a logical level. Certainly, in addition to the software implementation, the disclosure does not exclude other implementations, for example, using a logical device or a combination of software and hardware. That is to say, execution bodies of the following processing flows are not limited to logical units, and may also be hardware or logical devices.

Figure 12:
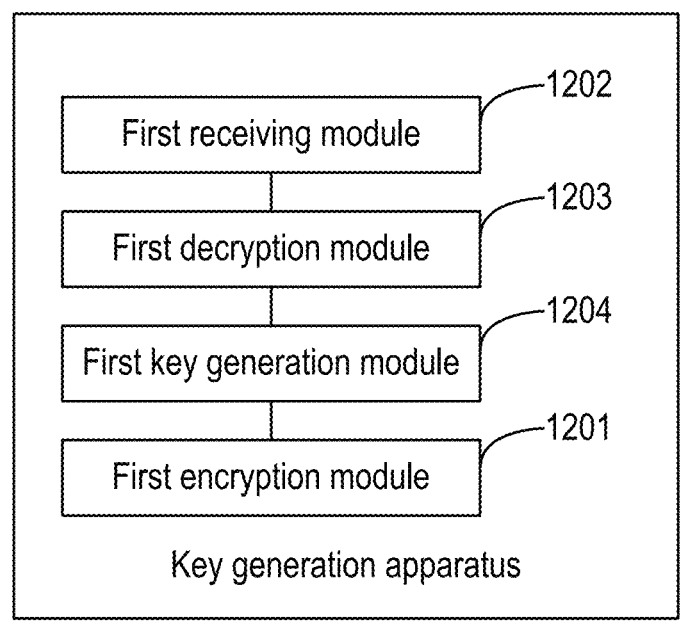
FIG. 12 is a block diagram illustrating a key generation apparatus according to some embodiments of the disclosure.

FIG. 12 is a block diagram illustrating a key generation apparatus according to some embodiments of the disclosure. As shown in FIG. 12, the key generation apparatus may include: a first encryption module 1201, a first receiving module 1202, a first decryption module 1203, and a first key generation module 1204.

The first encryption module 1201 is configured to encrypt a first key factor generated by the first device with an initial key, and send the encrypted first key factor to a second device through a first secure channel, wherein the initial key is a key preset for the first device and the second device.

The first receiving module 1202 is configured to receive, through the first secure channel, a second key factor encrypted with the initial key, wherein the second key factor is generated by the second device.

The first decryption module 1203 is configured to decrypt the second key factor encrypted with the initial key and received by the first receiving module through the first secure channel, so as to obtain the second key factor.

The first key generation module 1204 is configured to generate a shared key between the first device and the second device according to the first key factor and the second key factor decrypted by the first decryption module 1203.

Figure 13:
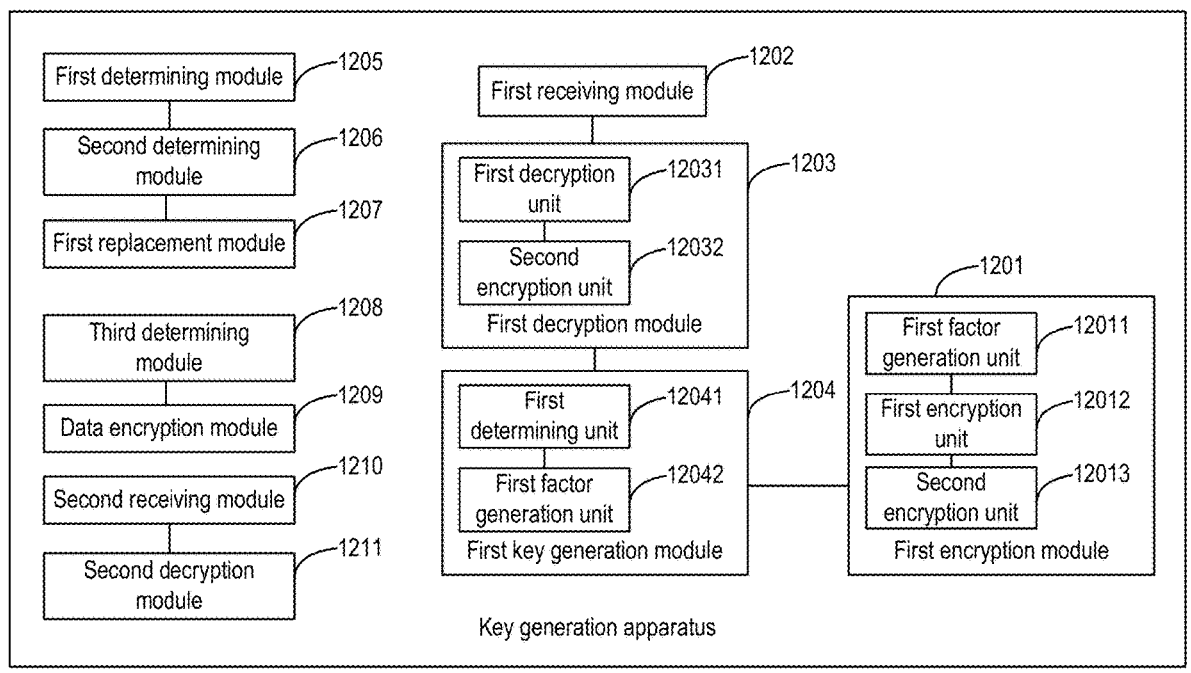
FIG. 13 is a block diagram illustrating a key generation apparatus according to some embodiments of the disclosure.

FIG. 13 is a block diagram illustrating a key generation apparatus according to some embodiments of the disclosure. As shown in FIG. 13, on the basis of the embodiments shown in FIG. 12, the first encryption module 1201 may include: a first factor generation unit 12011, configured to generate the first key factor through a pseudo-random function when the first device needs to initiate a key negotiation procedure with the second device; a first encryption unit 12012, configured to encrypt, with the initial key, the first key factor generated by the first factor generation unit, so as to obtain the first key factor after being subjected to a first encryption; and a second encryption unit 12013, configured to encrypt, with a first encryption key of the first secure channel, the first key factor after being subjected to the first encryption by the first encryption unit 12012, so as to obtain the first key factor after being subjected to a second encryption.

In one embodiment, the first decryption module 1203 includes: a first decryption unit 12031, configured to decrypt a double-encrypted second key factor with the first encryption key to obtain the second key factor after being subjected to a first decryption; and a second encryption unit 12032, configured to decrypt, with the initial key, the second key factor after being subjected to the first decryption by the first decryption unit 12031, so as to obtain the second key factor.

In one embodiment, the first key generation module 1204 may include: a first determining unit 12041, configured to determine an initial shared between the first device and the second device and a device identity of the first device; and a first factor generation unit 12042, configured to generate the shared key between the first device and the second device according to the first encryption key, the device identity determined by the first determining unit 12041, the first key factor, and the second key factor obtained by the first decryption module 1203.

In one embodiment, the first factor generation unit 12011 is specifically configured to: concatenate the initial key, the device identity, the first key factor, and the second key factor in series to obtain a combined string; segment the combined string into two substrings of equal length; perform a hash operation on the two substrings respectively to obtain two hash results; and perform an XOR operation on the two hash results by bit to obtain the shared key between the first device and the second device.

In one embodiment, the apparatus may further include: a first determining module 1205, configured to determine a replacement cycle of the shared key between the first device and the second device; a second determining module 1206, configured to re-calculate the first key factor and the second key factor according to the replacement cycle determined by the first determining module 1205; and a first replacement module 1207, configured to replace the shared key between the first device and the second device according to the first key factor and the second key factor re-calculated by the second determining module 1206.

In one embodiment, the apparatus may further include: a third determining module 1208, configured to determine data needed to be transmitted from the first device to the second device; and a data encryption module 1209, configured to encrypt, with the shared key, the to-be-transmitted data determined by the third determining module 1208, and send the encrypted data to the second device through the first secure channel.

In one embodiment, the apparatus may further include: a second receiving module 1210, configured to receive, through the first secure channel, response data generated by the second device when receiving the to-be-transmitted data, wherein the response data has already been encrypted with the shared key; and a second decryption module 1211, configured to decrypt, with the shared key, the response data encrypted with the shared key, so as to obtain the response data.

Figure 14:
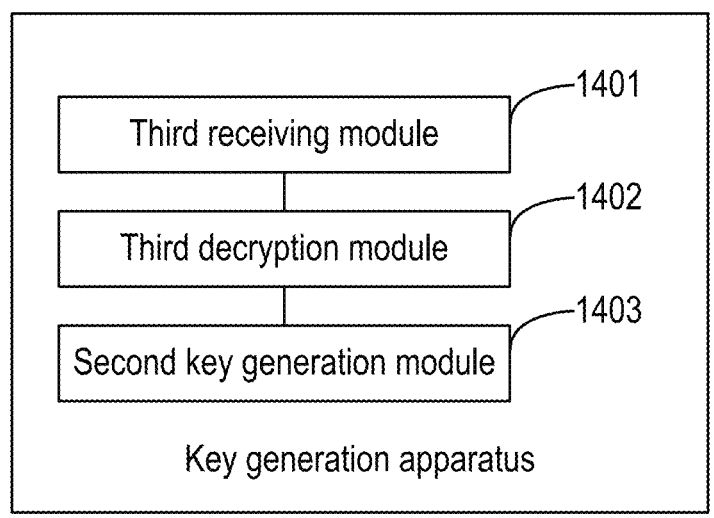
FIG. 14 is a block diagram illustrating a key generation apparatus according to some embodiments of the disclosure.

FIG. 14 is a block diagram illustrating a key generation apparatus according to some embodiments of the disclosure. As shown in FIG. 14, the key generation apparatus may include: a third receiving module 1401, a third decryption module 1402, and a second key generation module 1403.

The third receiving module 1401 is configured to receive, from a first device through a second secure channel, a first key factor encrypted with an initial key, wherein the initial key is a key preset between the first device and the second device.

The third decryption module 1402 is configured to decrypt the first key factor encrypted with the initial key, so as to obtain the first key factor.

The second key generation module 1403 is configured to generate a shared key between the first device and the second device according to the first key factor and a second key factor generated by the second device.

Figure 15:
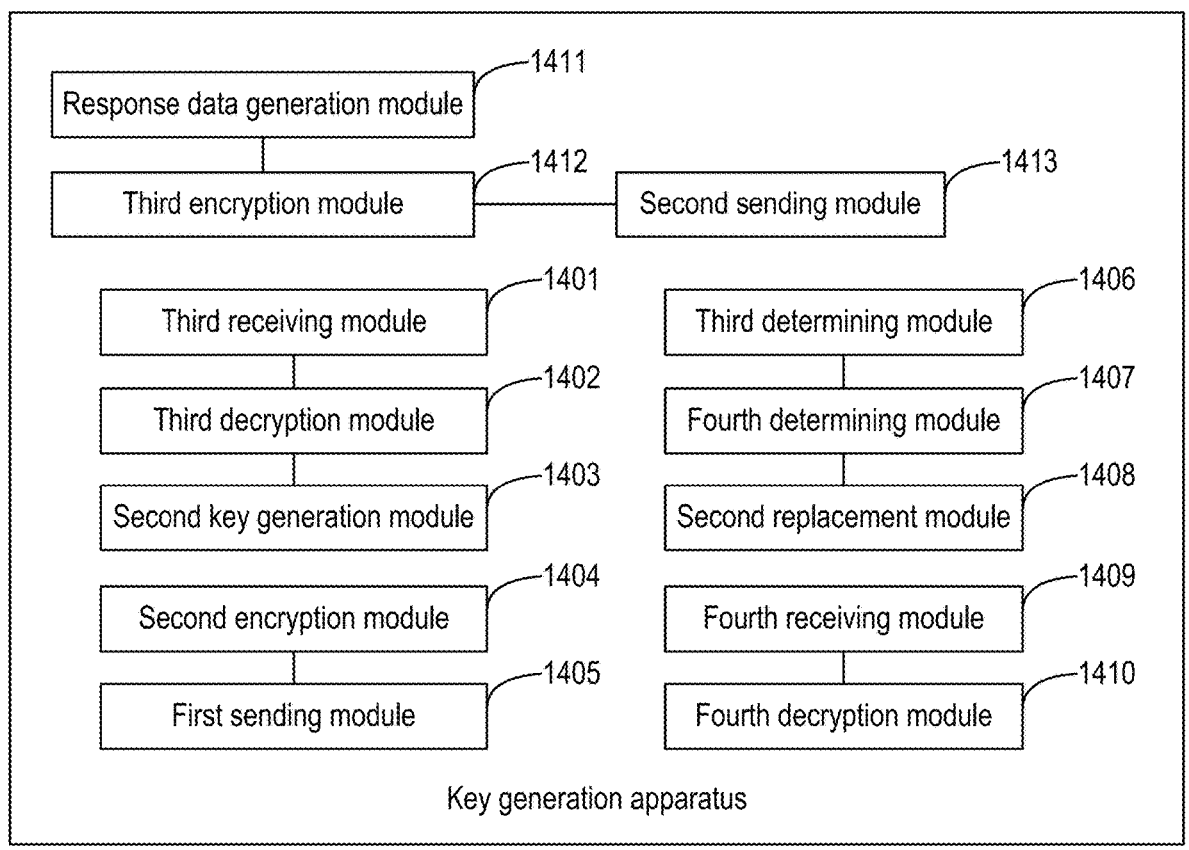
FIG. 15 is a block diagram illustrating a key generation apparatus according to some embodiments of the disclosure.

FIG. 15 is a block diagram illustrating a key generation apparatus according to some embodiments of the disclosure. As shown in FIG. 15, on the basis of the embodiments shown in FIG. 14, the second key generation module 1403 is specifically configured to: concatenate the initial key, a device identity of the first device, the first key factor, and the second key factor in series to obtain a combined string; segment the combined string into two substrings of equal length; perform a hash operation on the two substrings respectively to obtain two hash results; and perform an XOR operation on the two hash results by bit to obtain the shared key between the first device and the second device.

In one embodiment, the apparatus may further include: a second encryption module 1404, configured to encrypt the second key factor generated by the second device with the initial key; and a first sending module 1405, configured to send to the first device through the second secure channel the second key factor encrypted with the initial key.

In one embodiment, the apparatus may further include: a third determining module 1406, configured to determine a replacement cycle of the shared key between the first device and the second device; a fourth determining module 1407, configured to re-calculate the first key factor and the second key factor according to the replacement cycle; and a second replacement module 1408, configured to replace the shared key between the first device and the second device according to the re-calculated first key factor and the second key factor.

In one embodiment, the apparatus may further include: a fourth receiving module 1409, configured to receive, from the first device through the second secure channel, data to be transmitted that has been encrypted with the shared key; and a fourth decryption module 1410, configured to decrypt the to-be-transmitted data with the shared key.

In one embodiment, the apparatus may further include: a response data generation module 1411, configured to generate response data after receiving the to-be-transmitted data; a third encryption module 1412, configured to encrypt the response data with the shared key; and a second sending module 1413, configured to send to the first device through the second secure channel the response data encrypted with the shared key.

As can be seen from the aforementioned embodiments, a first key factor and a second key factor are both encrypted with an initial key when being forwarded by a gateway device. The initial key is a key preset for a first device and a second device. The gateway device, therefore, will not be able to know the first key factor and the second key factor. A shared key between the first device and the second device is generated through the first key factor and the second key factor. The finally negotiated shared key is therefore only known to the first device and the second device. The gateway device still is not able to acquire the negotiated shared key, thus ensuring a secure data transmission between the first device and the second device, and further reducing the risk of the data being illegally captured during transmission.

Those skilled in the art can derive other implementations of the disclosure after considering the specification and practicing the embodiments disclosed herein. The disclosure is intended to cover any variations, uses, or adaptive changes of the disclosure. These variations, uses, or adaptive changes follow general principles of the disclosure and include common knowledge or conventional technical means in the art that is not disclosed in the disclosure. The specification and embodiments are considered exemplary only, and the true scope and spirit of the disclosure are indicated by the following claims.

It should be further noted that the term "include", "comprise", or any other variation thereof is intended to encompass a non-exclusive inclusion, so that a process, method, commodity, or device that includes a series of elements includes not only those elements but also other elements not explicitly listed, or elements that are inherent to such a process, method, commodity, or device. The element defined by the statement "including one", without further limitation, does not preclude the presence of additional identical elements in the process, method, commodity, or device that includes the element.

The above descriptions are merely exemplary embodiments of the disclosure, and are not intended to limit the disclosure. Any alterations, equivalent substitutions, improvements and the like made within the spirit and principle of the disclosure shall fall within the protection scope of the disclosure.

What is claimed is:

1. A method comprising:
encrypting, by a terminal device, a first key factor generated by the terminal device using an initial key, the initial key comprising a key preset for the terminal device and a server device;
sending, by the terminal device, the encrypted first key factor to the server device through a first secure channel;
receiving, at the terminal device and through the first secure channel, a second key factor encrypted with the initial key, the second key factor encrypted by the server device using the initial key;
decrypting, by the terminal device, the second key factor using the initial key; and
generating, by the terminal device, a shared key based on the initial key, a device identity of the terminal device, the first key factor, and the decrypted second key factor.

2. The method of claim 1, the encrypting a first key factor generated by the terminal device using an initial key comprising:
initiating, by the terminal device, a key negotiation procedure with the server device;
generating, by the terminal device, the first key factor through a pseudo-random function in response to the initiating;
encrypting, by the terminal device, the first key factor using the initial key to obtain an encrypted first key factor; and
encrypting, by the terminal device, the encrypted first key factor with a first encryption key of the first secure channel to obtain a twice encrypted first key factor.

3. The method of claim 1, the decrypting the second key factor using the initial key comprising:
decrypting, by the terminal device, a double-encrypted second key factor with a first encryption key of the first secure channel to obtain a once decrypted second key factor; and
decrypting, by the terminal device, the once decrypted second key factor with the initial key to obtain an unencrypted second key factor.

4. The method of claim 1, the generating the shared key based on the initial key, the device identity, the first key factor, and the second key factor comprising:
concatenating, by the terminal device, the initial key, the device identity, the first key factor, and the second key factor in series to obtain a combined string;
segmenting, by the terminal device, the combined string into two substrings of equal length;
performing, by the terminal device, a hash operation on the two substrings respectively to obtain two hash results; and
performing, by the terminal device, an XOR operation on the two hash results by bit to obtain the shared key.

5. The method of claim 1, further comprising:
determining, by the terminal device, a replacement cycle of the shared key;
re-calculating, by the terminal device, the first key factor and the second key factor based on the replacement cycle; and
replacing, by the terminal device, the shared key using the re-determined first key factor and the second key factor.

6. The method of claim 1, further comprising:
determining, by the terminal device, data to be transmitted to the server device;
encrypting, by the terminal device, the data to be transmitted with the shared key; and
sending, by the terminal device, the encrypted data to the server device through the first secure channel.

7. The method of claim 6, further comprising:
receiving, by the terminal device through the first secure channel, response data generated by the server device in response to the data to be transmitted, the response data encrypted with the shared key; and
decrypting, by the terminal device, using the shared key.

8. A method comprising:
receiving, at a server device through a second secure channel, a first key factor encrypted using an initial key from a terminal device, the initial key comprising a key preset between the terminal device and the server device;
decrypting, by the server device, the first key factor;
generating, by the server device, a shared key based on the first key factor and a second key factor generated by the server device, the shared key generated by:
concatenating the initial key, a device identity of the first device, the first key factor, and the second key factor in series to obtain a combined string,
segmenting the combined string into two substrings of equal length,
performing a hash operation on the two substrings respectively to obtain two hash results, and
performing an XOR operation on the two hash results by bit to obtain the shared key between the first device and the second device;
encrypting, by the server device, the second key factor using the initial key; and
sending, by the server device, the second key factor to the terminal device through the second secure channel.

9. The method of claim 8, further comprising:
determining, by the server device, a replacement cycle of the shared key between the terminal device and the server device;
re-calculating, by the server device, the first key factor and the second key factor according to the replacement cycle; and
replacing, by the server device, the shared key based on the re-calculated first key factor and the second key factor.

10. The method of claim 8, further comprising:
receiving, by the server device from the terminal device through the second secure channel, data that has been encrypted with the shared key; and
decrypting, by the server device, the data with the shared key.

11. The method of claim 10, further comprising:
generating, by the server device, response data after receiving the data;

encrypting, by the server device, the response data with the shared key; and sending, by the server device, to the first device through the second secure channel.

12. An apparatus comprising:

a processor; and a storage medium for tangibly storing thereon program logic for execution by the processor, the stored program logic comprising instructions that, when executed by the processor, cause the processor to perform the operations of:

generating a first key factor;

encrypting the first key factor using an initial key, the initial key comprising a key preset for the apparatus and a server device;

sending the encrypted first key factor to the server device through a first secure channel;

receiving, through the first secure channel, a second key factor encrypted with the initial key, the second key factor encrypted by the server device using the initial key;

decrypting the second key factor using the initial key; and generating a shared key based on the initial key, a device identity of the terminal device, the first key factor, and the decrypted second key factor.

13. The apparatus of claim 12, the encrypting a first key factor using an initial key comprising:

initiating a key negotiation procedure with the server device;

generating the first key factor through a pseudo-random function in response to the initiating;

encrypting the first key factor using the initial key to obtain an encrypted first key factor; and encrypting the encrypted first key factor with a first encryption key of the first secure channel to obtain a twice encrypted first key factor.

14. The apparatus of claim 12, the decrypting the second key factor using the initial key comprising:

decrypting a double-encrypted second key factor with a first encryption key of the first secure channel to obtain a once decrypted second key factor; and decrypting the once decrypted second key factor with the initial key to obtain an unencrypted second key factor.

15. The apparatus of claim 12, the generating the shared key based on the initial key, the device identity, the first key factor, and the second key factor comprising:

concatenating the initial key, the device identity, the first key factor, and the second key factor in series to obtain a combined string;

segmenting the combined string into two substrings of equal length;

performing a hash operation on the two substrings respectively to obtain two hash results; and performing an XOR operation on the two hash results by bit to obtain the shared key.

16. The apparatus of claim 12, the operations further comprising:

determining a replacement cycle of the shared key;

re-calculating the first key factor and the second key factor based on the replacement cycle; and replacing the shared key using the re-determined first key factor and the second key factor.

17. The apparatus of claim 12, the operations further comprising:

determining data to be transmitted to the server device;

encrypting the data to be transmitted with the shared key; and sending the encrypted data to the server device through the first secure channel.

18. The apparatus of claim 17, the operations further comprising:

receiving, through the first secure channel, response data generated by the server device in response to the data to be transmitted, the response data encrypted with the shared key; and decrypting, using the shared key.

* * * * *